United States Patent
Askeland

(10) Patent No.: US 11,285,874 B2
(45) Date of Patent: *Mar. 29, 2022

(54) PROVIDING VISUAL REFERENCES TO PREVENT MOTION SICKNESS IN VEHICLES

(71) Applicant: Zoox, Inc., Foster City, CA (US)

(72) Inventor: Jacob Lee Askeland, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/801,079

(22) Filed: Feb. 25, 2020

(65) Prior Publication Data

US 2020/0189466 A1  Jun. 18, 2020

Related U.S. Application Data

(63) Continuation of application No. 15/337,528, filed on Oct. 28, 2016, now Pat. No. 10,589,679.

(51) Int. Cl.
*H04N 7/18* (2006.01)
*B60R 1/00* (2022.01)
(Continued)

(52) U.S. Cl.
CPC .............. *B60R 1/002* (2013.01); *A63F 13/26* (2014.09); *A63F 13/95* (2014.09); *B60R 11/04* (2013.01);
(Continued)

(58) Field of Classification Search
CPC ... B60R 1/00; B60R 16/037; B60R 2300/105; G03B 21/58; G06Q 30/0645;
(Continued)

(56) References Cited

U.S. PATENT DOCUMENTS

2007/0237417 A1* 10/2007 Agrawal .................... G06T 7/80
382/255
2012/0292986 A1* 11/2012 Riedel ...................... B60Q 3/47
307/9.1
(Continued)

OTHER PUBLICATIONS

Office Action for U.S. Appl. No. 15/337,528, dated Oct. 19, 2018, Askeland, "Providing Visual References to Prevent Motion Sickness in Vehicles", 20 pages.
(Continued)

*Primary Examiner* — Masum Billah
(74) *Attorney, Agent, or Firm* — Lee & Hayes, P.C.

(57) ABSTRACT

Systems and methods to provide visual references to passengers in vehicles to prevent motion sickness. The system can include a controller and one or more projectors and/or displays. The controller can detect movement of a vehicle and project images within the vehicle that comport with the detected movement. The system can include a projector to project images on the interior of the vehicle. The system can include one or more displays to display images inside the vehicle. The controller can receive data from one or more cameras, accelerometers, navigation units, magnetometers, and other components to detect the motion of the vehicle. The system can display visual references on the dashboard, door panels, and other interior surfaces to complete the view of passengers, or provide other visual reference, to prevent motion sickness.

20 Claims, 11 Drawing Sheets

(51) Int. Cl.
    *B60R 11/04*     (2006.01)
    *G06K 9/00*     (2022.01)
    *H04N 9/31*     (2006.01)
    *G09G 5/14*     (2006.01)
    *A63F 13/26*     (2014.01)
    *A63F 13/95*     (2014.01)
    *B60R 11/00*     (2006.01)

(52) U.S. Cl.
    CPC ........... *G06K 9/00838* (2013.01); *G09G 5/14* (2013.01); *H04N 7/181* (2013.01); *H04N 9/3185* (2013.01); *B60R 2011/004* (2013.01); *B60R 2300/102* (2013.01); *B60R 2300/105* (2013.01); *B60R 2300/20* (2013.01); *B60R 2300/802* (2013.01); *G09G 2320/08* (2013.01); *G09G 2320/10* (2013.01); *G09G 2354/00* (2013.01); *G09G 2380/10* (2013.01)

(58) Field of Classification Search
    CPC ........ G06Q 50/30; G06Q 10/00; G06Q 10/02; G06Q 10/1095; G06Q 30/0241
    USPC .......................................... 362/490; 348/148
    See application file for complete search history.

(56) References Cited

U.S. PATENT DOCUMENTS

| | | | |
|---|---|---|---|
| 2016/0003636 A1* | 1/2016 | Ng-Thow-Hing | G08G 1/167 701/26 |
| 2016/0182823 A1* | 6/2016 | Murasumi | B60R 11/04 348/38 |
| 2016/0243986 A1* | 8/2016 | Ishiguro | H04N 7/181 |
| 2017/0253254 A1* | 9/2017 | Sweeney | B60R 1/00 |
| 2017/0313326 A1 | 11/2017 | Sweeney et al. | |
| 2018/0068505 A1 | 3/2018 | Mullett | |

OTHER PUBLICATIONS

Office Action for U.S. Appl. No. 15/337,528, dated May 2, 2019, Askeland, "Providing Visual References to Prevent Motion Sickness in Vehicles", 24 pages.

* cited by examiner

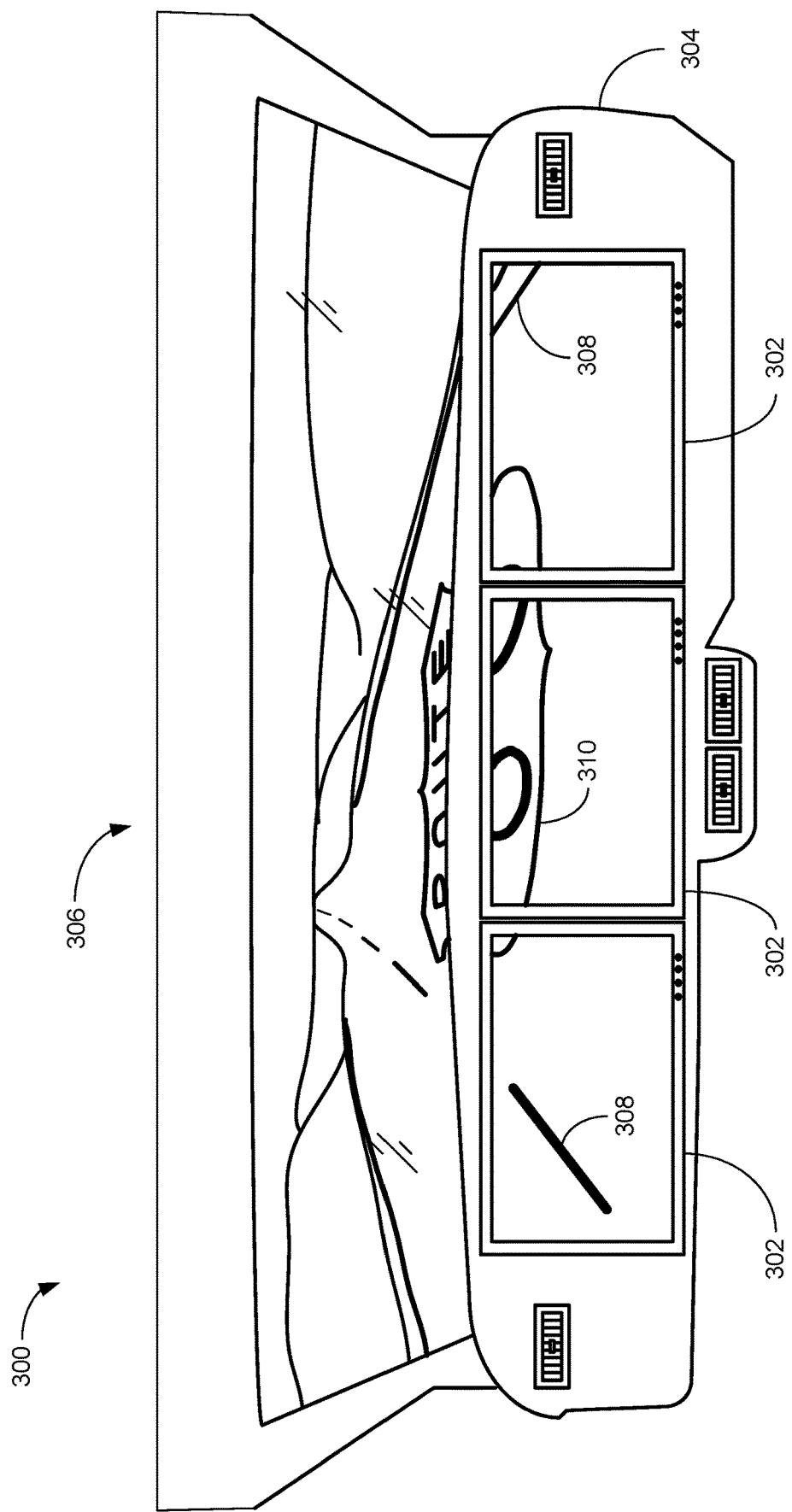

PROVIDING VISUAL REFERENCES TO PREVENT MOTION SICKNESS IN VEHICLES

RELATED APPLICATIONS

This Application claims priority to and is a continuation of U.S. patent application Ser. No. 15/337,528, filed on Oct. 28, 2016, the entire contents of which are incorporated herein by reference.

BACKGROUND

Autonomous vehicles can improve the safety and efficiency of transportation systems. Autonomous automobiles, for example, rely on microprocessors and sensors to make routing and maneuvering decisions. As a result, in many cases, these vehicles can react more quickly and accurately to changing conditions than a human driver. Thus, autonomous vehicles can travel closer together and at higher speeds, for example, reducing congestion.

Many people suffer from motion sickness. This can be caused by the fact that the interior of the vehicle appears still, yet the person's brain senses vehicle motion. The symptoms may be reduced somewhat if the person looks out the window, which enables the person's brain to match the perceived motion with the movement of the scenery outside the window.

Unfortunately, for some people, motion sickness may be increased when riding in autonomous vehicles, trains, boats, and airplanes. This is often because there are little or no visual clues as to upcoming maneuvers. In the case of autonomous vehicles, this can be because these vehicles often have no visible steering wheel. In other vehicles, such as ships or airplanes, this may be because the controls are remotely located from the passengers in a cockpit or wheelhouse. Motion sickness may also be increased as the result of the potentially rapid movements or changes in direction caused during collision avoidance or due to vehicle programming. Regardless, it can be difficult for passengers to anticipate maneuvers, increasing the incidence of motion sickness.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 3 depicts a dashboard in a vehicle with a plurality of displays to prevent motion sickness, in accordance with some examples of the present disclosure.

DETAILED DESCRIPTION

Figure 1A:
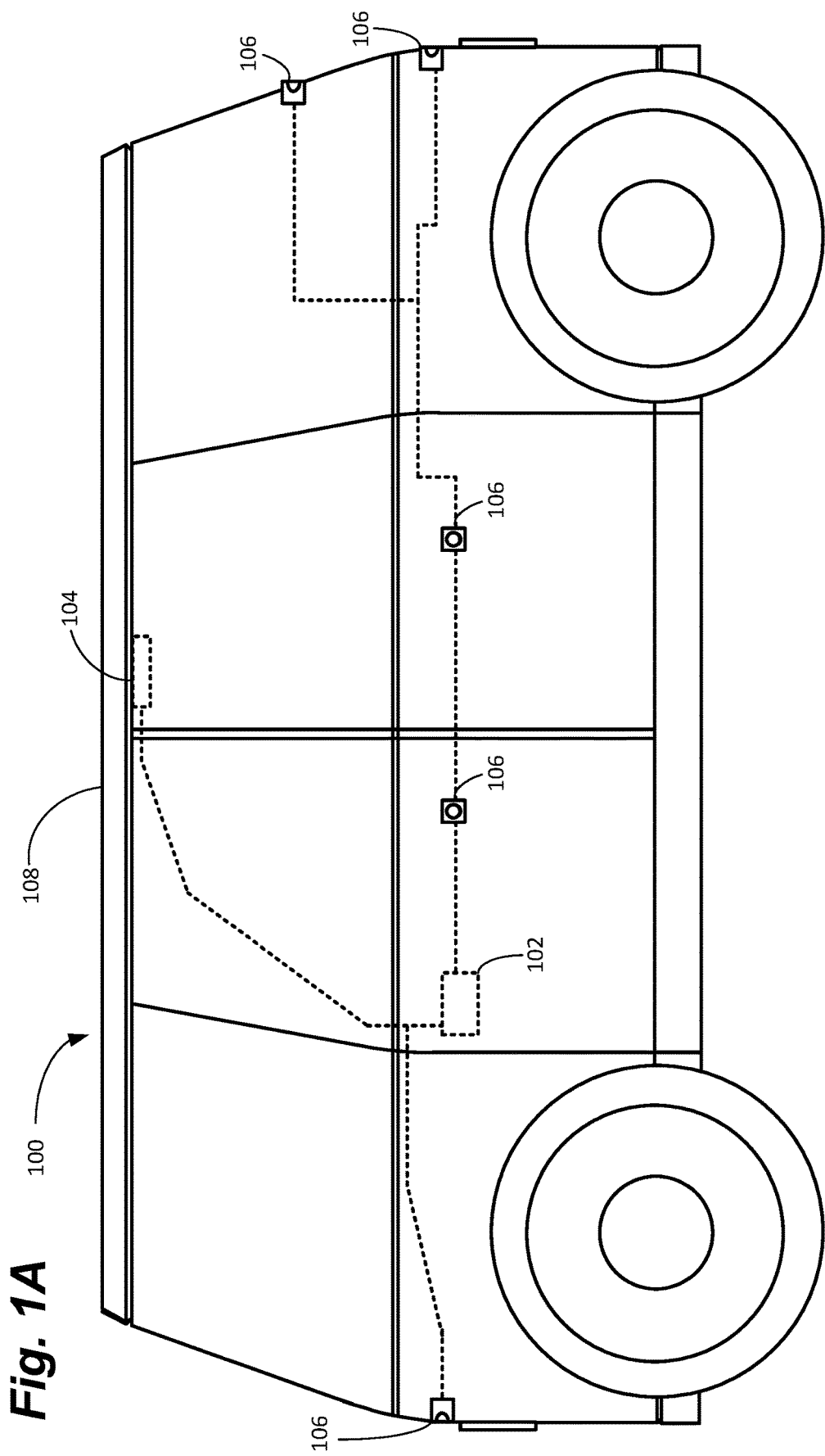
FIG. 1A is a side view schematic diagram of a system to prevent motion sickness in autonomous vehicles, in accordance with some examples of the present disclosure.

Examples of the present disclosure are related to systems and methods for reducing nausea in vehicles by providing additional visual feedback. The system can provide visual feedback to enable users to anticipate and process movement of the vehicle. In some examples, the system can provide a projection of the outer view from the vehicle on the interior of the vehicle. In other examples, the system can project visual cues on the interior that provide a constant compass reference, for example, or otherwise serve to depict the rotational and/or translational motion of the vehicle. By providing passengers with the correct visual cues, motion sickness can be reduced or eliminated.

Example systems and methods are described below in the context of passenger vehicles (e.g., personal vehicles such as cars and trucks and for hire vehicles such as taxies and shuttles). One of skill in the art will recognize, however, that embodiments of the present disclosure are not so limited. Indeed, the systems and methods used herein can also be used for other autonomous ground vehicles, such as buses and trains; and, indeed, for other types of vehicles such as boats and planes that commonly cause motion sickness. In addition, while the system is described for use with autonomous vehicles with little or no human intervention, the system can be used for non-autonomous vehicles, such as taxies and busses, where passengers may be affected by the driver's actions. As discussed below, the system can be used anytime there may be a visual disconnect between the motion of a vehicle and the passenger's perception.

The systems and methods described hereinafter as making up the various elements of the present disclosure are intended to be illustrative and not restrictive. Many suitable systems, methods, components, and configurations that would perform the same or a similar function as the systems and methods described herein, are intended to be included within the scope of the disclosure.

As mentioned above, people suffer from motion sickness in all kinds of vehicles. This is generally thought to be caused by a disconnect between what the person feels, via their inner ear and other senses, and what they see—the stationary interior of the vehicle. As a result, motion sickness can be worse when the person is in the back seat of a car, for example, inside a plane, or in the cabin of a boat with little or no outward visibility. Thus, motion sickness symptoms can sometimes be reduced by looking out the window, for example, to provide visual feedback to the brain that matches the sensory feedback from other senses caused by the motion.

In addition to the common causes of motion sickness, because autonomous vehicles can be "self-driving," it is often not necessary for them to have steering wheels or windows, among other things, which can further increase the likelihood and/or severity of motion sickness. Autonomous vehicles can operate based on data from sensors on the vehicles. These vehicles can use high-resolution video cameras, for example, to detect lane markings and proximity sensors to detect obstacles and other vehicles, among other things. Based on their programming, however, these vehicles may maneuver sharply to avoid an accident, for example, with little or no warning. Thus, motion sickness can be exacerbated because now the person has (1) the same stationary interior visual cues and (2) no active visual cues (e.g., a driver turning the steering wheel and/or leaning) to anticipate turns and other maneuvers.

To this end, this application describes a system that provides the necessary visual feedback to users to reduce, or eliminate, symptoms associated with motion sickness. In some examples, the system can project the outside view around the vehicle onto the interior of the vehicle and/or provide a visual reference that is steady with reference to a particular heading (e.g., north). In some examples, the system may additionally, or alternatively, project virtual scenes, games, or other visual schemes, provided the visual cues of such scenes coincide with the motion of the vehicle. The system can receive inputs from various sensors such as, for example, inertial measurement units (IMUs), gyroscopes, wheel encoders, GPS receivers, cameras, LIDAR, or radar. The sensors can be onboard vehicle sensors (i.e., built into, or embedded in, the vehicle), standalone sensors, or both to provide this motion matching.

Figure 1B:
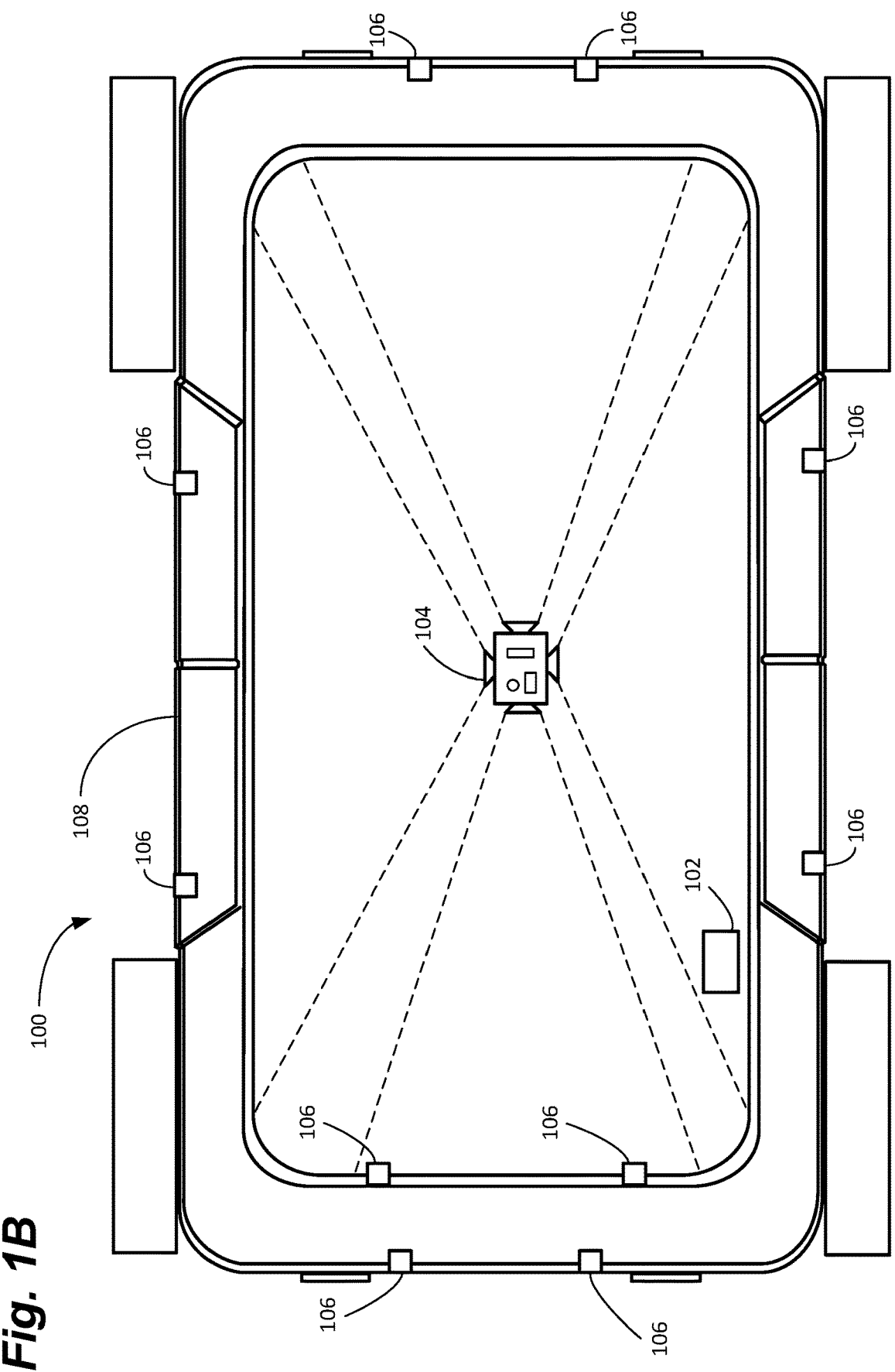
FIG. 1B is a top view schematic diagram of a system to prevent motion sickness in autonomous vehicles, in accordance with some examples of the present disclosure.

In some examples, as shown in FIGS. 1A and 1B, therefore, generally speaking, the system 100 can comprise a controller 102 and one or more video sources 104. The video sources 104 can comprise, for example, one or more projectors, one or more displays, or other image producing devices. In some examples, the controller 102 can receive inputs from external sensors 106 (e.g., external to the system 100 and/or embedded in the vehicle 108) of a vehicle 108 that enable the controller 102 to detect the motion of the vehicle 108. The controller 102 can be in communication with the various external sensors 106 via a cable area network (CAN), local area network (LAN), wireless (e.g., Wi-Fi or Bluetooth®), or other suitable means.

The vehicle 108 can be equipped with external sensors 106 that enable various systems on the vehicle 108 to detect, for example, acceleration, deceleration, wheel slip, and turning of the vehicle 108. These systems can include, for example, antilock braking systems (ABS), traction control systems (TCS), and autonomous driving systems, among other things. These sensors can include, but are not limited to, IMUs, gyroscopes, wheel encoders, GPS receivers, camera, LIDAR, and radar, among other things.

The vehicle 108 can be equipped with cameras (video and still), radar, light detection and ranging (LIDAR), sonar, and/or other object detection or proximity sensors. The vehicle 108 can also be equipped with accelerometers, speed sensors, gyroscopes, altimeters, compasses, and other equipment that report to a central processing unit (CPU) for the vehicle to measure acceleration, speed, orientation (e.g., direction of travel, roll, pitch, yaw, etc.), and other characteristics.

The vehicle 108 may also be equipped with a global positioning system (GPS), magnetometer or electronic compass, and other navigational tools. Of course, if the vehicle 108 is a plane or boat, for example, then the vehicle 108 may also include additional or alternative external sensors 106 to detect altitude, air speed, ground speed, water speed, and other motions.

The speed with which the system 100 reacts to vehicle motion can be relevant to preventing motion sickness. In other words, if the visual references provided by the system 100 do not relatively closely match the motions of the vehicle 108, the visual references may actually exacerbate motion sickness. Thus, reacting quickly to vehicle motion, or even predicting vehicle motion, can be useful.

To this end, in some examples, the system 100 can use sensors embedded in the vehicle 108 to quickly detect motion. The system 100 can receive signals from the vehicle's steering angle position sensor, for example, that the front wheels are being turned. In this manner, the system 100 can essentially predict a turn. In other words, due to inertia, mechanical losses, and other factors, a signal indicating a change in steering angle may actually precede a turn by some small margin. As a result, this data could be used to detect a turn before it is detected by an accelerometer, for example. Similarly, a signal from a throttle position sensor (TPS) indicating a change in throttle position, for example, may predict a change in acceleration or speed prior to it being measurable by an accelerometer or other external sensor.

Similarly, if an object is detected by long-range sensors (e.g., cameras, radar, or LIDAR) that detect objects and features at longer distances (e.g., on the order of hundreds of feet), the system 100 can predict that a turn will be necessary and when/where it will likely occur. In this manner, the system 100 can provide updated visual references at substantially the same time the maneuver occurs. Indeed, in some examples, the software and/or hardware used to provide autonomous vehicle control can also provide and update the visual references. If a pedestrian walks in front of the vehicle 108, for example, the system 100 can predict an evasive maneuver around the pedestrian, plot a change in course, and update the visual references substantially simultaneously.

As the vehicle 108 travels and maneuvers, therefore, the external sensors 106 on the vehicle 108 can provide data to the system 100 regarding the motion of the vehicle. The system 100 can then use this data to provide visual feedback to the user inside the vehicle 108 to "counter," or coincide with, the motion. This can include, for example, projecting an outside view on the inside of the vehicle, providing visual cues that are stationary with respect to heading, or even providing a virtual environment or game that provides visual cues that match the motion of the vehicle 108.

Regardless of what visual cues are provided and the means by which they are provided—e.g., by projectors or display screens—the visual cues can "fill in the blanks" in the user's perception, the absence of which generally causes motion sickness. As mentioned above, motion sickness is often caused by the user sensing motion, but seeing the stationary (relative to them) interior of the vehicle 108. To this end, in some examples, the portion of the view from the vehicle 108 that is obscured by the interior of the vehicle 108, for example, can be recreated and projected, or displayed, on the interior of the vehicle 108. In other words, the portion of the view out the right side of the vehicle 108 that is obscured by the right door panel—i.e., the view from below the side window—can be projected or displayed on the door panel. Similarly, the portion of the view out the front of the vehicle 108 that is obscured by the hood and dashboard can be projected on the dashboard, and so on. Thus, as the vehicle 108 travels down the road, the user's view can be recreated as if there were no vehicle 108 around them. As a result, the visual feedback provided to the user is complete and motion sickness can be reduced or prevented.

Indeed, "removing the vehicle" from the user's field of view can have many uses. This feature can also be used for sightseeing, delivery, and other purposes. In other words, when sightseeing on a tour bus, for example, rider's views of the sights may be partially blocked by the bus itself. In this case, the user's experience can be improved by essentially removing the visual obstruction of the tour bus (e.g., the body, window frames, seats, etc.). By projecting the rider's view on the inside of the bus, for example, the rider is provided with a less obstructed view of the sights as if the bus was (at least partially) not there (or the bus was clear).

This technology can also be used to aid taxi drivers, delivery drivers, and anyone looking for a particular address or street, for example. In many instances, road signs, addresses, and other features may be hidden by the vehicle itself. If a house number is painted on the curb, for example, it may be hidden by the body of the vehicle (e.g., the doors) as the driver drives by. Using the system described herein, however, the house number can be displayed, or projected, on the inside of the door panel, as if the door panel was transparent. This can enable the user to more easily identify features that might otherwise be obscured by the vehicle. In addition, the system 100 can virtually eliminate blind spots, which can reduce collisions when merging, changing lanes, etc.

As shown, in some examples, the system 100 can be mounted in an autonomous vehicle 108. As a result, rather than having redundant, internal sensors, the controller 102 can receive input from the existing external sensors 106 on the vehicle 108. Thus, an autonomous vehicle (e.g., a taxicab), for example, may be equipped with a full array of cameras and sensors (collectively external sensors 106) to enable it to navigate autonomously. As mentioned above, this sensor data can be monitored by the controller 102 for use with the system 100. Thus, in some examples, at least translation and rotation of the vehicle 108 can be monitored.

Figure 2A:
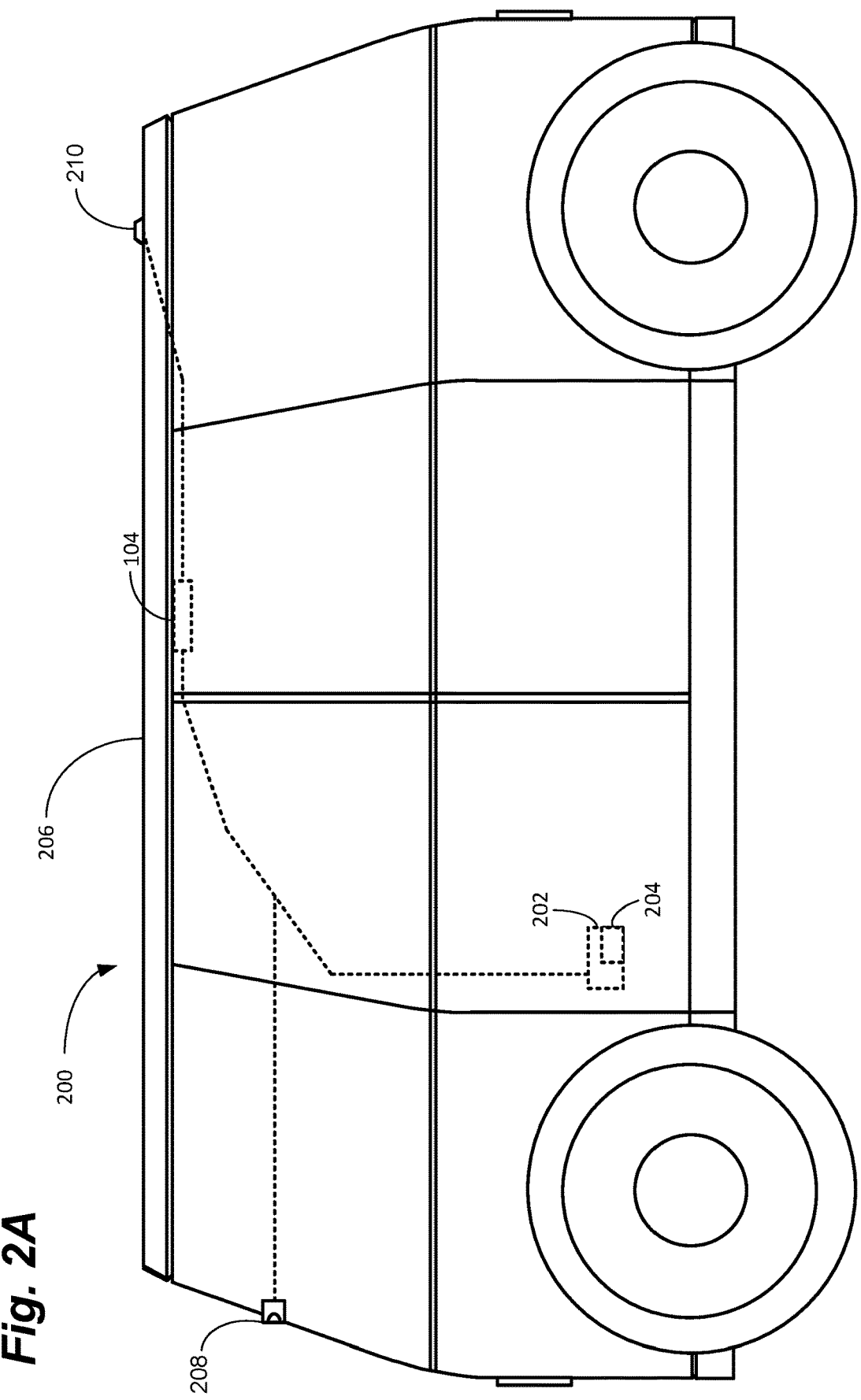
FIG. 2A is a side view schematic diagram of a system to prevent motion sickness in non-autonomous vehicles, in accordance with some examples of the present disclosure.
Figure 2B:
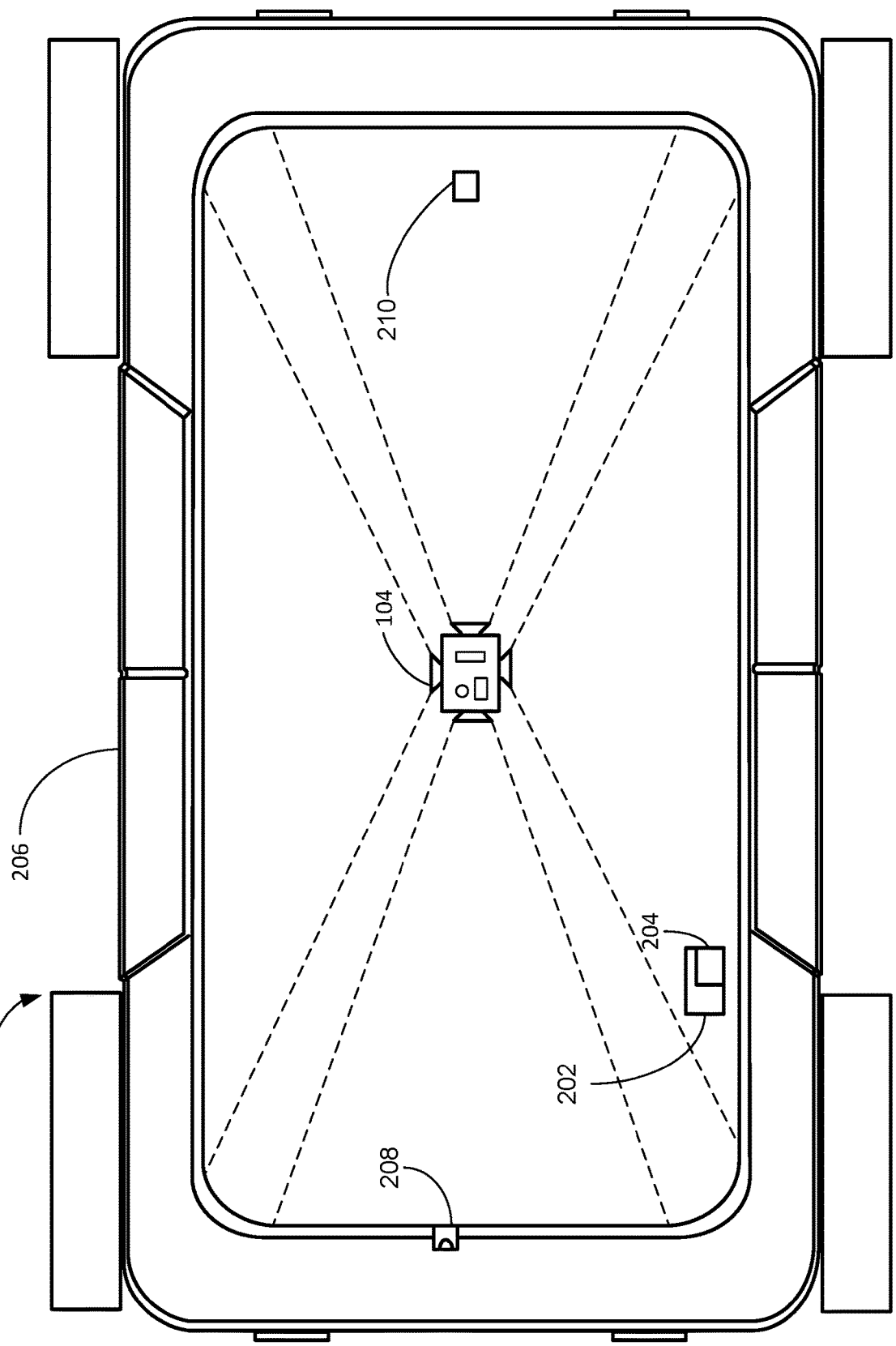
FIG. 2B is a top view schematic diagram of a system to prevent motion sickness in non-autonomous vehicles, in accordance with some examples of the present disclosure.

In other examples, as shown in FIGS. 2A and 2B, the system 200 can include a controller 202 equipped with one or more internal sensors 204. In this case, the controller 202 can include one or more accelerometers, gyroscopes, GPS receivers, and other equipment, similar to those discussed above, but not associated with the vehicle 108. The system 200 can also include one or more cameras 208, GPS antennas 210, and/or other sensors that can be retrofitted to existing vehicles 206. This can enable the system 200 to be easily installed in vehicles 206 that are not equipped with autonomous systems, or other built-on sensors (e.g., external sensors 106).

As before, the system 200 can use input from the one or more internal sensors 204 to project or display visual feedback to counteract motion sickness symptoms. As discussed below, the system 200 can include a projector 104, displays 302 (e.g., physical display screens, discussed below with reference to FIG. 3), or other means to project or display images inside the vehicle consistent with the motion of the vehicle 108. The projector 104 can project an object located in front of the vehicle 108 on the dashboard of the vehicle 108, for example, as the vehicle 108 is moving forward. If the vehicle 108 then turns left, the view inside the vehicle 108 can rotate right, for example, so that the object is now displayed on the right door panels. In this manner, a passenger inside the vehicle is presented with images that are consistent with the motion of the vehicle 108.

As mentioned above, a major contributor to motion sickness is the perception of motion, but stationary visual cues. As the vehicle moves forward, for example, a portion of the forward view out the vehicle is obscured by the hood and the dashboard, among other things. For myriad reasons, however, simply removing the hood and the dashboard of the vehicle is not a practical solution. The front of the vehicle is often where the engine and/or transmission is located, for example, and the dashboard obscures steering, heating, ventilation, and air conditioning (HVAC), electronics, and other components.

In an autonomous vehicle, however, some of these systems become redundant. It may be possible to remove the steering wheel, for example, because passengers have no need to steer the car. To this end, examples of the present disclosure can comprise a system 300 for displaying, or projecting, outward views on various interior panels of the vehicle. As shown in FIG. 3, for example, multiple displays 302 can be provided on the dashboard 304, or other portions, of the vehicle 306.

In this configuration, the system 300 can receive inputs from various internal 204 or external 106 (e.g., vehicle) sensors. A controller 102, 202 can then use this information to present visual cues on the displays 302 consistent with the motion. As shown, the inputs can include forward-looking video from a front mounted camera (not shown), for example. This can enable the system 300 to display the portion of the forward view obscured by the hood and dashboard 304 on the dashboard 304 itself. In this manner, with minor exceptions, the outward view from the vehicle 306 is substantially complete.

Thus, as objects "disappear" and become obscured by the front of the vehicle 306, they appear on the displays 302. This can include lane markings 308, for example, road signs 310, man hole covers, and any other objects in the field of view of the camera. Depending on the angle of the cameras, for example, the displays 302 may also display more distant objects such as, for example, buildings, trees, and other landmarks in front of the vehicle 306. The displays 302 can include a sufficiently high refresh rate to present a substantially seamless and complete view out the front of the vehicle 306. In some examples, the displays 302 can essentially provide video playback from the front of the vehicle 306.

Figure 4:
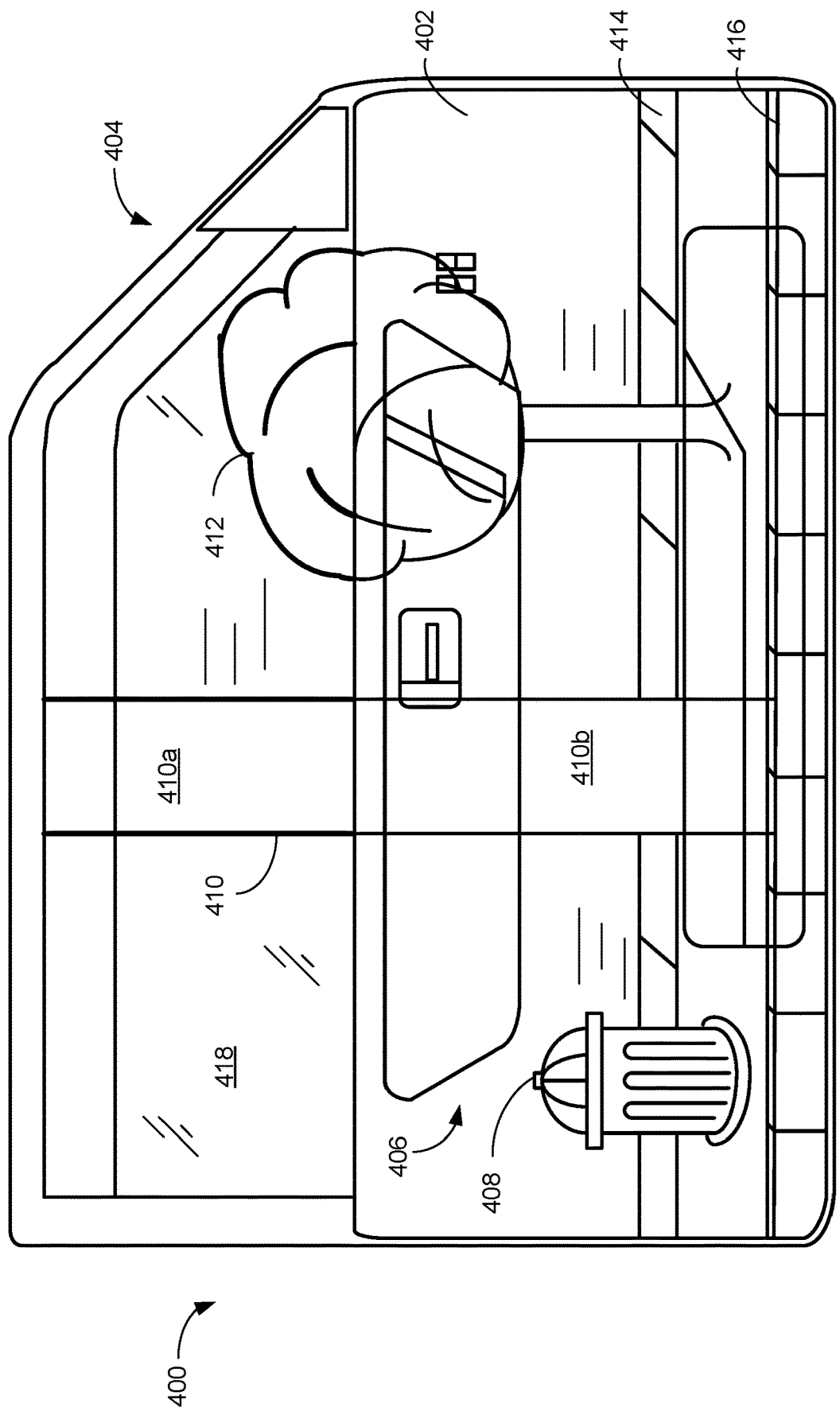
FIG. 4 depicts a door panel in a vehicle with a plurality of visual references displayed thereon to prevent motion sickness, in accordance with some examples of the present disclosure.

Motion sickness can often be abated by looking out the window. This enables the user's brain to synchronize the moving scenery out the window with the motion of the vehicle, removing any internal conflict. This conflict between the various senses is the major cause of motion sickness. To this end, as shown in FIG. 4, examples of the present disclosure can also include a system 400 for projecting, or displaying, outward views on the sides of the interior of the vehicle 404. As shown, in some examples, the system 400 can project images on the door panel 402 of the vehicle 404. Thus, rather than having to look out the window which, in a crowded car may be impossible, the user can simply look at the door panel 402. A projector 104 can receive data from a side-mounted camera, proximity sensor, or other external sensors 106, or internal sensors 204 and project images on the door panel 402 consistent with the motion of the vehicle 404. In other examples, the door panel 402 and/or windows 418 can comprise a flexible display to provide images directly on the door panel 402 (e.g., a flexible electronic paper display or a flexible organic light emitting diode (OLED) display). The display can be attached to the surface of the door panel 402, for example, or can form portions of the door panel 402 or window 418.

As shown, as the vehicle 404 travels down a road, for example, the system 400 can project, or display, the portion of the scene outside the vehicle 404 that is obscured by the door panel 402. Thus, as the vehicle 404 passes objects 406, such as fire hydrants 408, telephone poles 410, shrubs 412, sidewalks 414, curbs 416, and other objects, the portion obscured by the door panel 402 can be recreated on the door panel 402. In this manner, the user may see a first portion 410a of the telephone pole 410 directly through the side window 418 and a second portion 410b of the telephone pole 410 projected on the door panel 402.

As shown, as the vehicle 404 moves forward, the objects 406 move "backwards" on the door panel 402 at the same rate. In this manner, rather than looking at a stationary door panel 402, the objects 406 in/on the door panel 402 appear to move at a proportional rate to the motion of the vehicle 404. Again, this can help to alleviate any motion sickness by enabling the user's perception of motion to be matched with the motion on the objects 406 on the door panel 402. Thus, as the vehicle 404 moves forward at a particular speed, the objects 406 displayed on the door panel 402 can move backward at the same speed. When the vehicle 404 stops, on the other hand, the objects 406 displayed on the door panel 402 can also stop (in the case of stationary objects) or move at their own speed (in the case of moving objects).

Figure 5A:
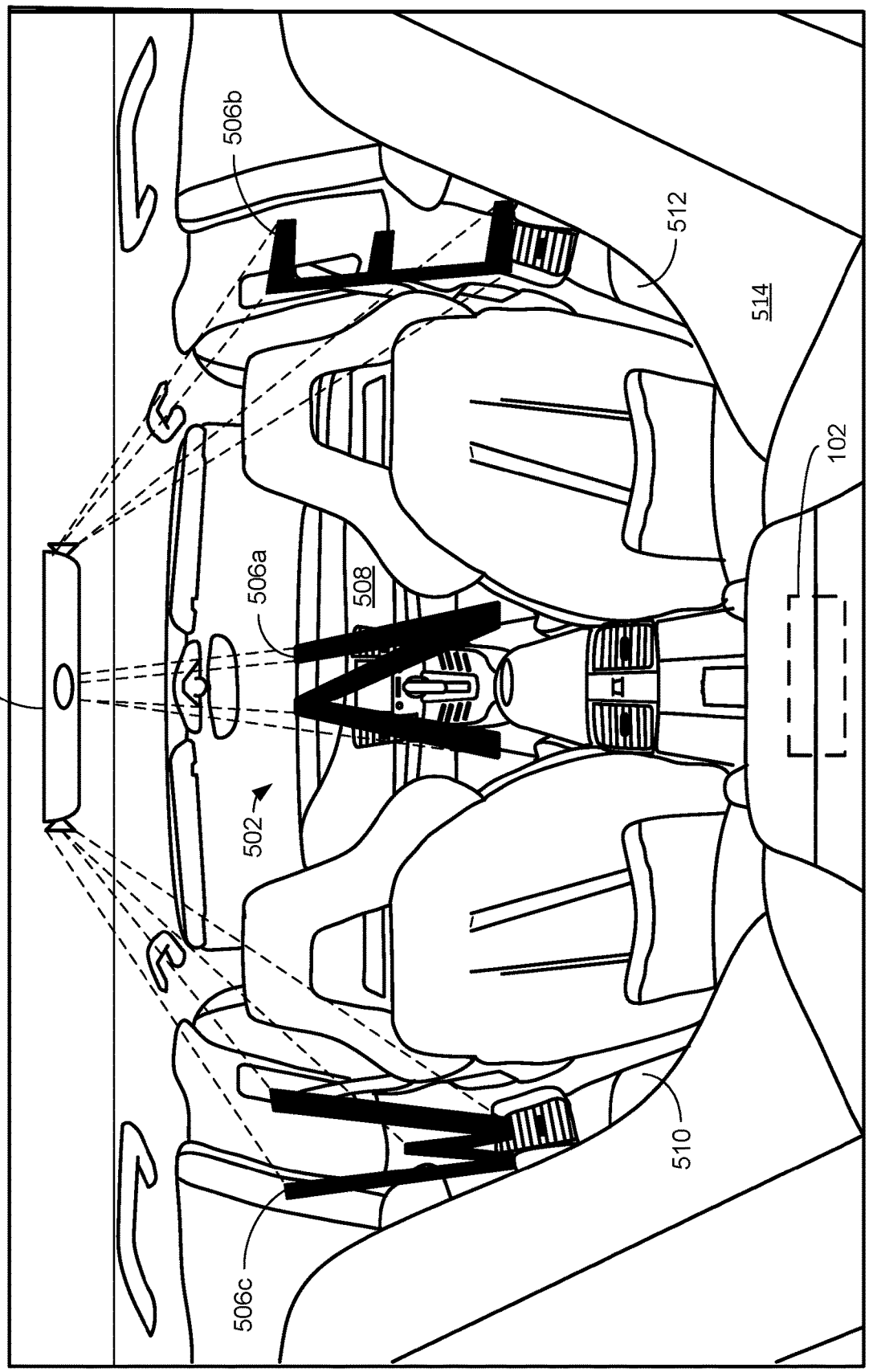
FIGS. 5A-5C depict a vehicle's interior with a plurality of visual references updated in response to the motion of the vehicle, in accordance with some examples of the present disclosure.
Figure 5B:
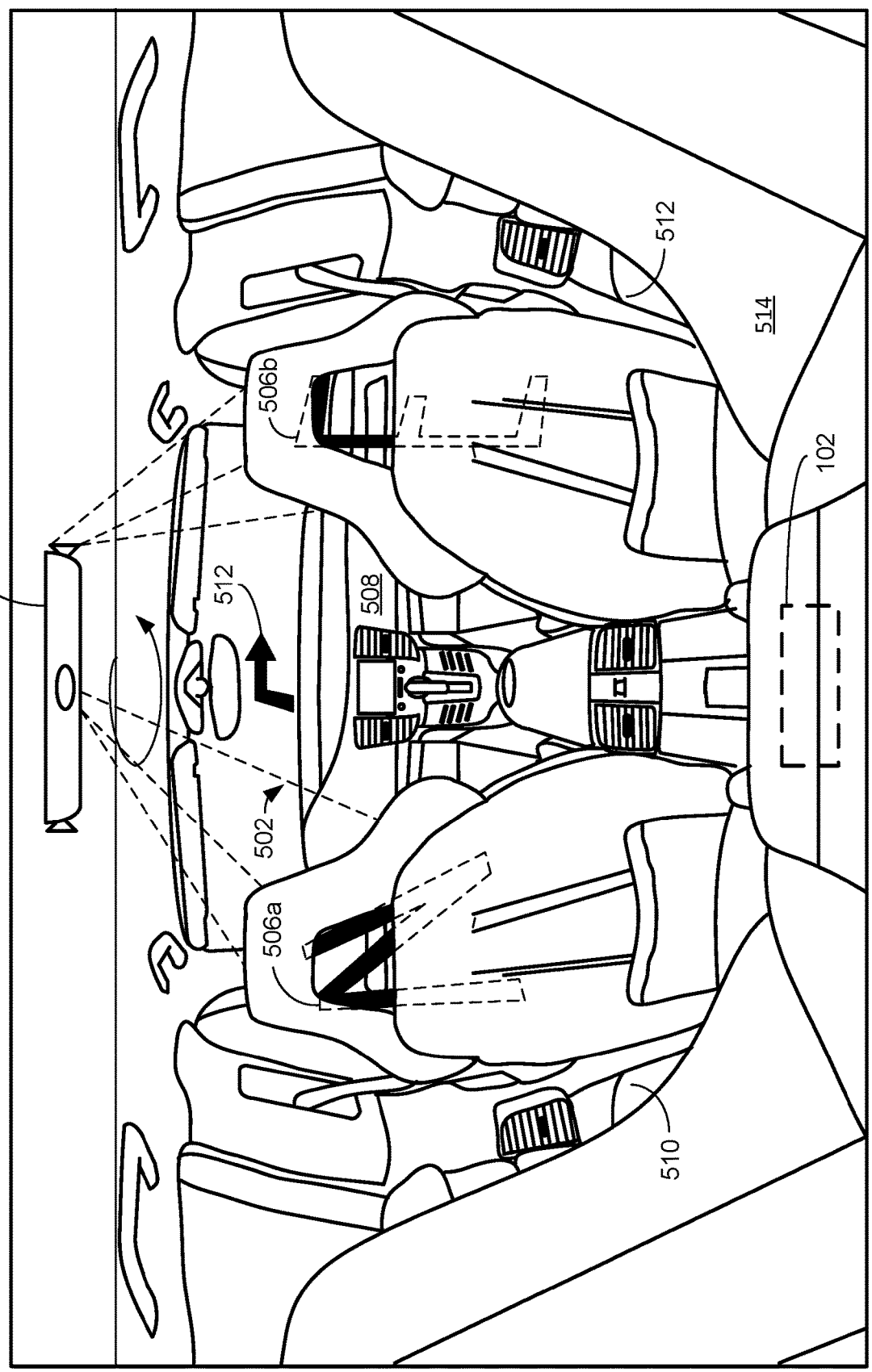
Figure 5C:
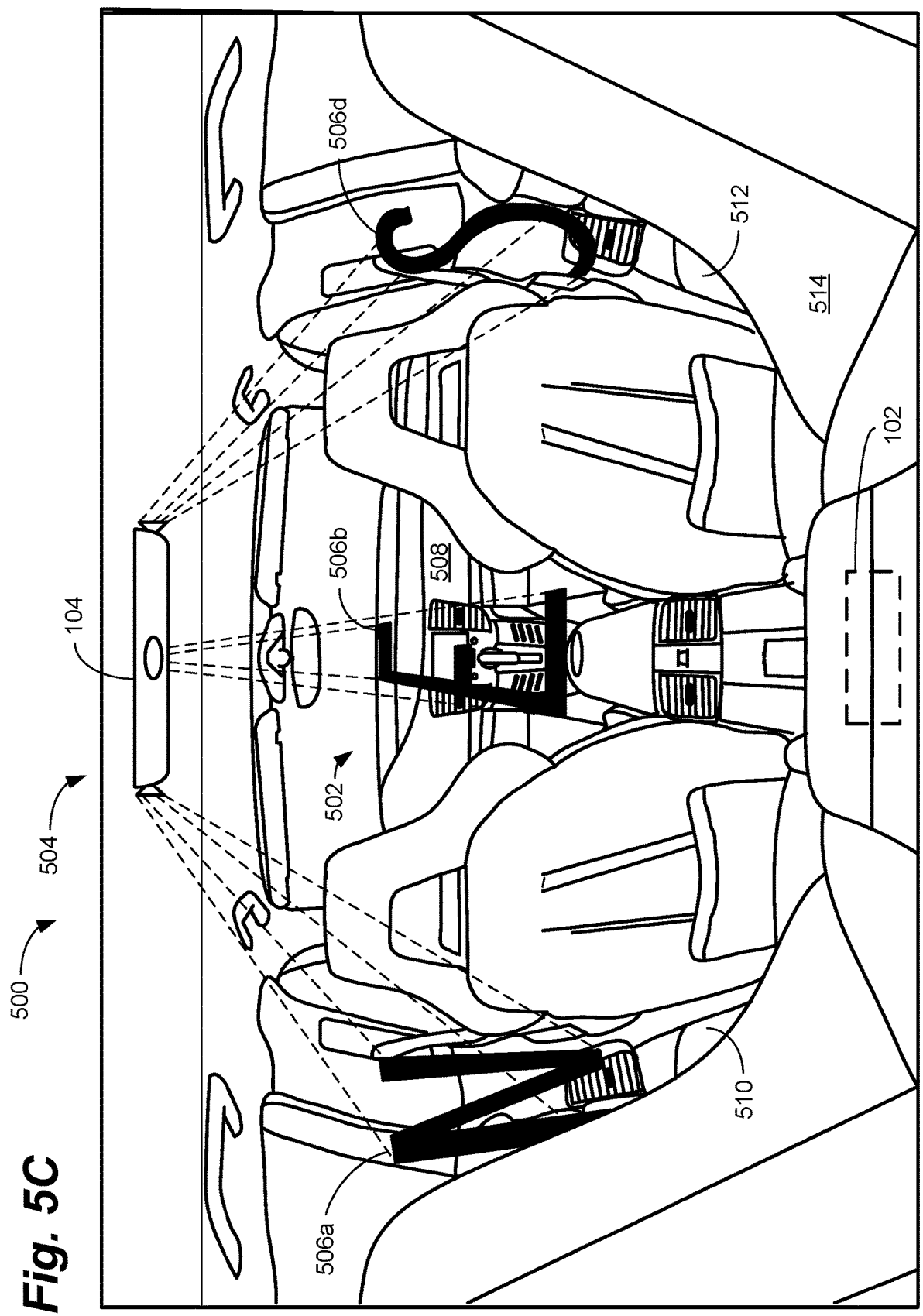

As shown in FIGS. 5A-5C, rather than projecting the outside view inside the vehicle 504, examples of the present disclosure can also comprise a system 500 to provide one or more fixed reference points on the interior 502 of the vehicle 504. As before, the system 500 can include a controller 102 and a projector 104. The projector 104 can provide one or more visual references 506 inside the vehicle 504.

The actual composition of the visual references 506 is somewhat immaterial. The visual references 506 can comprise compass points, as shown, scenes from outside the vehicle 504 (e.g., video from external cameras), or even games. Thus, in an example of an augmented reality scenario, pedestrians outside the vehicle 504 can be augmented by computer-generated graphics to resemble zombies in a virtual game projected on the interior 502 of the vehicle 504.

In other examples, the visual references 506 may not correspond to any physical objects or structures in the external environment proximate the vehicle 504, but may be entirely virtual. As mentioned above, what is important is that visual references 506 coincide with the movement of the vehicle 504. Thus, the system 500 can project a simulation of driving through space, for example, with stars, planets, and other visual references 506. Thus, while virtual, these visual references 506 can nonetheless be projected onto the interior surfaces (e.g., the dashboard 508 and door panels 510, 512) of the vehicle 504 such that the scene changes in response to positional, velocity, and/or inertial changes of the vehicle 504.

What is important, therefore, is that the visual references 506—regardless of their design—move in concert with the movements of the vehicle 504 to maintain the "correct" orientation and provide the visual cues for the passenger(s) to match their sensation of movement as the vehicle 504 maneuvers. This can include the visual references 506 moving with respect to the rotation and, at least to some extent, the translation of the vehicle 504. In some examples, therefore, some visual references 506 may rotate opposite the direction of a turn, for example, while others may change in size or position relative to the translational motion of the vehicle 504. In other examples, the same visual references 506 can move, rotate, change in size, etc., in response to both rotation and translation.

Thus, as shown in FIG. 5A, when the vehicle 504 is traveling north, for example, the system 500 can display a large "N" 506a on the dashboard 508 of the vehicle 504. In some examples, at the same time, the system 500 can display a large "W," for west, on the left door panel 510 and a large "E," for east, on the right door panel 512. In this manner, the user is oriented toward the motion and orientation of the vehicle 504. Of course, using compass points is somewhat arbitrary and other visual references 506 can be used.

As shown in FIG. 5B, however, when the vehicle 504 begins to execute a right turn, the system 500 begins to rotate the visual references 506 to match the rotation of the vehicle 504. Thus, in this example, the N 506a begins to move leftward across the dashboard 508 towards the left door panel 510. Similarly, the E 506b begins to move from the right door panel 512 towards the right side of the dashboard 508. Thus, as the vehicle 504 rotates to the right, the visual references 506 move to the left to maintain a consistent reference point for the user. As shown in FIG. 5C, upon completion of a typical 90-degree right-hand turn, therefore, the N 506a has moved completely to the left door panel 510. Similarly, the E 506b has moved completely to the dashboard 508. Finally, an "S" 506d, for south, has rotated (either from the backseat 514 or simply out of view) to the right door panel 512. Thus, the visual references 506, which in this case represent compass points, have been moved to maintain their "correct" orientation with respect to magnetic north (e.g., N 506a faces magnetic north, E 506b faces east, etc.).

In this manner, the rotation of the vehicle 504 is matched by the counter rotation of the visual references 506. Thus, the user is provided with a visual reference that accords with the rotational motion sensed by the user's inner ear and other senses. As mentioned above, the visual references 506 can be of any design, it is the motion of the visual references 506 relative to the motion of the vehicle 504 that is important. Thus, in a similar scenario, if the user was approaching the Golden Gate Bridge and then turned right, for example, the bridge can begin projecting onto the dashboard 508 and then rotate to the left door panel 510 in response to the turn to the right. Of course, any points of reference outside the vehicle 504 can be used in the same manner.

Figure 6:
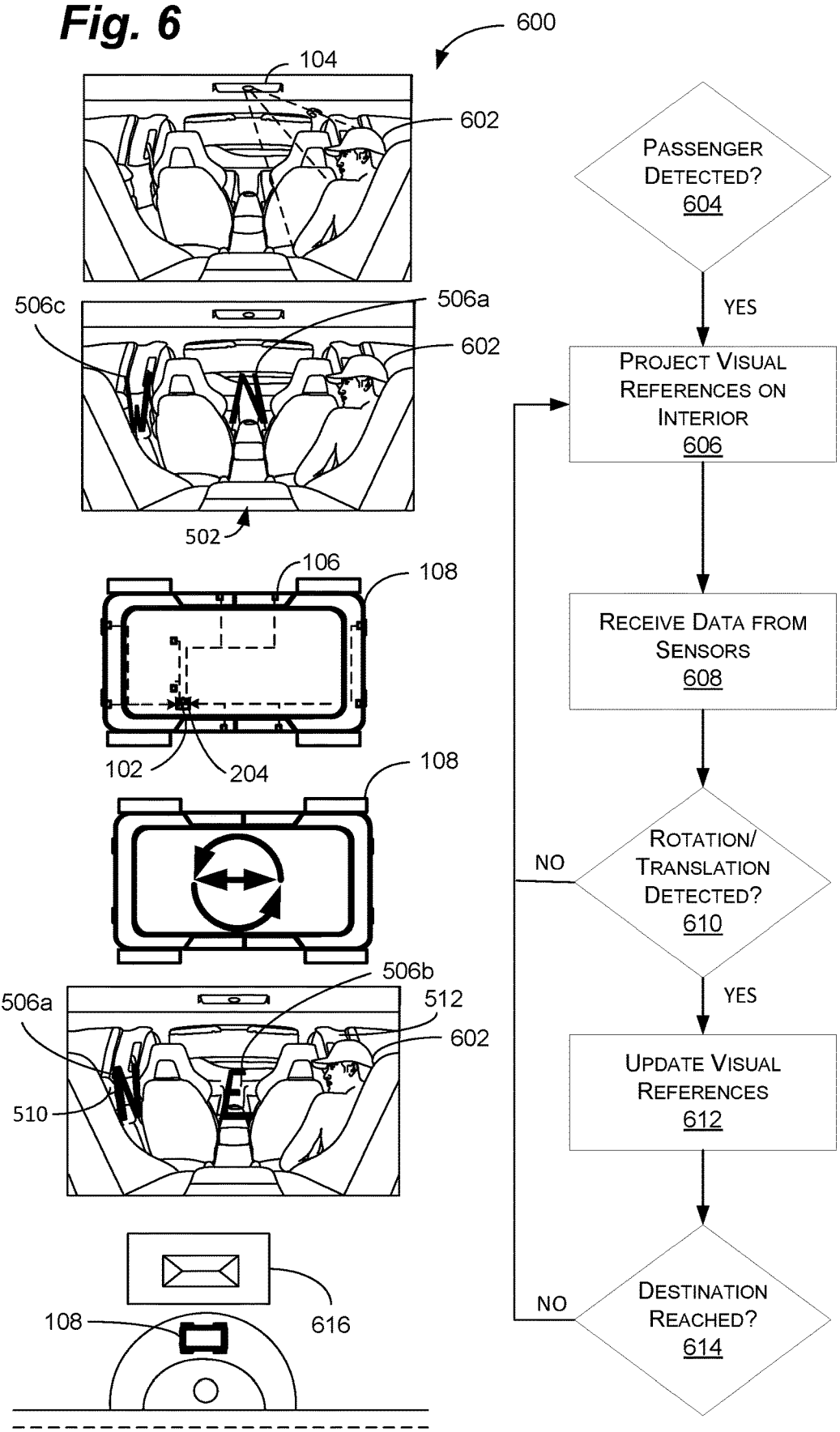
FIG. 6 is a flowchart depicting a method for providing visual references in a vehicle to prevent motion sickness, in accordance with some examples of the present disclosure.

As shown in FIG. 6, examples of the present disclosure can also comprise a method 600 for providing visual references 506 to users 602 when traveling in a vehicle 108. Of course, if the vehicle 108 is unoccupied, then it may be unnecessary to display visual references 506, though this can be configured by the vehicle 108 provider (e.g., the taxi company) or the user 602.

In some examples, like the aforementioned zombie game, the provider may choose to display the visual references 506 purely for promotional purposes. In other examples, the system 100 can include marketing, gaming, or other programming. In this configuration, in some examples, the system 100 may display advertising when the vehicle 108 is stationary, for example, and then provide visual references 506 when the vehicle 108 is moving. In other examples, the system 100 may display advertising when the vehicle 108 is unoccupied, for example, and then provide visual references 506 when the vehicle 108 is occupied (e.g., bystanders may see the advertising though they are outside the vehicle 108). Thus, the vehicle 108 can essentially serve as a rolling billboard when unoccupied, with advertising, marketing, and other material projected inside and/or outside the vehicle 108.

In some cases, the programming provided to the user can be selected based on preferences or information from a profile associated with the user and the system. In other words, in some examples the method 600 may be accessed by the user via an application on the user's electronic device (e.g., a cell phone or tablet). In this configuration, the user can set various preferences in the application related to what kind of advertising content that may be interested in, what types of games they like, etc. The application may also include demographic data for the user to make relevant content choices. In some examples, the application can also provide content to the system 100, 200 via an internet, or other connection, on the user's electronic device.

In some examples, the content provided can include paid advertisements and promotions. In other words, the system can act as an additional revenue stream and can present paid content from advertisers (e.g., advertisements or infomercials). The content can be provided by an onboard component of the system 100, 200 (e.g., the controller 202), via an internet connection for the system 100, 200, or via the user's electronic device.

In some examples, the content can be provided by a remote, internet connected, content server associated with the system 100, 200. The server can be associated with the application, for example, and can maintain the user's profile and advertiser content, games, and other content. The content server can then provide content to the system 100, 200, or the user's electronic device, based on the user's profile, among other things.

Optionally, therefore, at 604, the method 600 can detect when a user 602, or passenger, is inside the vehicle 108. This can be achieved using video cameras, for example, motion sensors, proximity sensors, seat belt sensors, weight sensors, or other suitable means. Upon detecting the user 602, the method 600 can activate the system 100.

In some examples, if multiple passengers are in the vehicle 506, it may or may not be beneficial to provide slightly different views to each passenger. In other words, based on (1) the relatively close proximity of passengers inside the vehicle 506 to each other and (2) the relatively long distances between many objects outside the vehicle 506, the different viewpoints of the passengers may be insignificant. Indeed, in some examples, just providing front and back views may be enough to abate motion sickness, especially when the visual references 504 appear far enough away that a difference in forward motion is not perceivably different when sitting in different seats.

To this end, in some examples, the system 100 could use information related to sensor data, for example, or the known route to be taken by the vehicle 506 to ensure that the visual references 504 used by the system 100 remain sufficiently in the distance that any difference in perspectives inside the vehicle 506 are imperceptible. In other examples, the system 100 could utilize a 3-D display, for example, that projects subtly different views at different angles on each display 302 or from each projector 104. In still other examples, vision-based eye-tracking software can be used, for example, to adjust each display 302 or projector 104 for any subset of passengers whose gaze does not intersect.

At 606, the visual references 506 can be projected, or displayed, on the interior 502 of the vehicle 108. As shown, the visual references 506 can include compass headings 506a, 506c, for example, to enable the user 602 to orient themselves toward the direction of travel. In other examples, the visual references 506 can be a projection of the outward views from the vehicle 108. In other words, the forward view can be projected on the dashboard 508, the right side view can be projected on the right door panel 512, and the left side view can be projected on the left door panel 510.

In still other examples, the visual references 506 can comprise a virtual environment, a video game, television programming, or other media. The visual references 506 can also comprise a combination of real objects (e.g., objects from outside the vehicle 504) and virtual objects. Pedestrians adjacent the vehicle can be projected as zombies in an in-vehicle game, for example, where the user 602 shoots zombies as the vehicle 108 travels. As mentioned above, the actual design of the visual references 506 is somewhat arbitrary, what is important is their coordination with the vehicle's motion.

To this end, at 608, the controller 102 can receive data from various internal 204 or external 106 sensors regarding the motion of the vehicle 108. The data can include data regarding the vehicle's translational motion from one or more vehicle speed sensors (VSS), for example, wheel encoders, IMUS, or GPS receivers. The data can also include data regarding the vehicle's rotational motion from one or more accelerometers, for example, gyros, or magnetometers. The data can also include imaging from one or more videos, still, or night vision cameras. The data can also include proximity data from one or more proximity sensors such as, for example, LIDAR, radar, or ultrasonic proximity sensors.

Regardless of the source, the controller 102 can receive data related to at least the rotational motion of the vehicle 108. In some examples, the data may also include, for example, lateral and longitudinal acceleration, velocity, and heading. In some examples, such as for use in airplanes and boats, the controller 102 can also receive data related to the pitch, roll, and yaw of the vehicle 108.

At 610, based on the aforementioned data, the controller 102 can detect if the vehicle 108 is moving—in either translation or rotation. If the vehicle 108 is not moving, then, depending on the visual references 506 in use, no updates to the visual references 506 may be needed. If, on the other hand, rotational and/or translational motion is detected by the controller 102, then the visual references 506 can be updated to correspond to the detected motion.

To this end, at 612, the visual references 506 can be updated based on the motion of the vehicle 108. If the vehicle 108 is moving forward, for example, the visual references 506 displayed on the door panels 510, 512 may appear to be moving past the vehicle 108, while the visual references 506 on the dashboard 508 may appear to grow larger. Similarly, if the vehicle 108 turns right, the visual references 506 on the right door panel 512 can move towards the dashboard 508, and so on. Thus, the visual references 506 can be updated to coincide with (or, counter) the motion of the vehicle 108.

At 614, in some examples, the controller 102 can determine if the vehicle 108 has reached the destination 616 or the user 602 has exited the vehicle 108. As mentioned above, in some examples, the system 100 may only operate when the user 602 is inside the car. Of course, in some examples, the system 100 can simply operate continuously, obviating this step. As mentioned above, in some examples, when the vehicle 108 has reached the destination 616, the system 100 may revert to advertising, marketing, or other programming.

FIG. 6 is a flow diagram of an illustrative process illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 7:
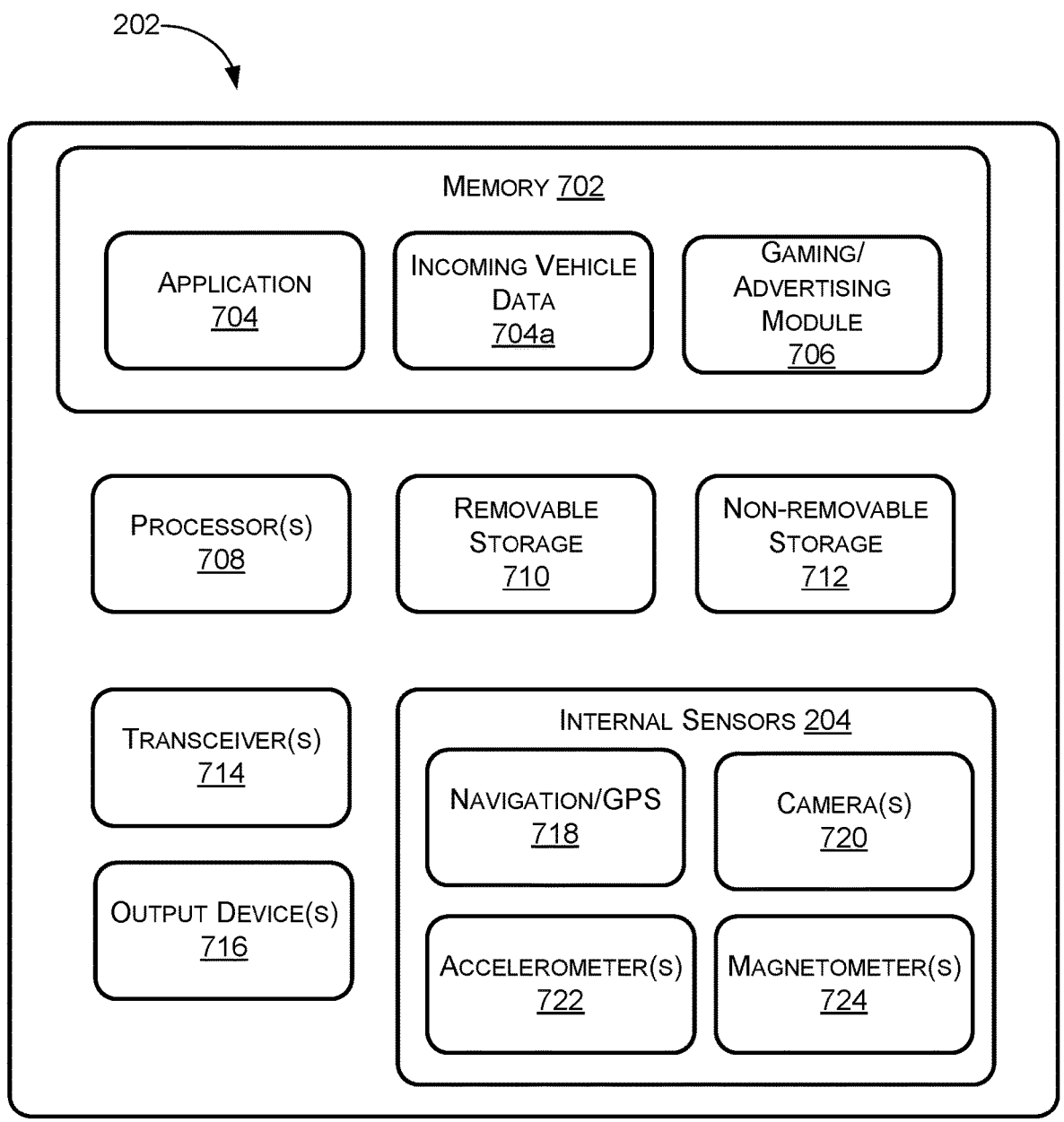
FIG. 7 is a component level schematic diagram of an example of a controller for use with the system of FIGS. 2A and 2B, in accordance with some examples of the present disclosure.

FIG. 7 is a component level schematic view of a controller 202 for use with the system 200 and methods 600 described herein. The controller 202 can comprise a dedicated electronic device, such as a dedicated microcontroller, or can be a cell phone, smart phone, laptop, tablet, or other electronic devices that comprise a number of components to gather data and provide visual references 506 based on the data.

The controller 202 can comprise memory 702 configured to include computer-executable instructions including at least an application 704 for receiving data and controlling displays 302 and/or projectors 104, the incoming vehicle data 704a, and a gaming/advertising module 706. The controller 202 can also include one or more processors 708, removable storage 710, non-removable storage 712, transceiver(s) 714, output device(s) 716, and one or more internal sensors 204. Of course, in some examples, rather than being located in the controller 202, the application 704 and/or gaming/advertising module 706, or portions thereof, can be located on a remote server, on the user's electronic device, or in another component of the system 100, 200.

In various implementations, the memory 702 can be volatile (such as random access memory, or RAM), non-volatile (such as read only memory, or ROM, flash memory, etc.), or some combination of the two. The memory 702 can also comprise the application 704. As discussed below, the application 704 receives sensor data, from either internal 204 or external 106 sensors, and can provide the user 602 with visual references 506 to reduce, or eliminate, motion sickness. In some examples, the application 704 can also gather the desired incoming vehicle data 704a from the various internal sensors 204 of the controller 202. This may be useful in autonomous systems, for example, to track control inputs to improve smoothness, routing, or efficiency, for example, and improve user 602 comfort.

In some examples, the application 704 can stream incoming vehicle data 704a in its raw form to a central control server for tracking and logging. In other examples, the application 704 can package the incoming vehicle data 704a (e.g., using message session relay protocol (MSRP) packets, hypertext transfer protocol (HTTP) files, etc.) to be sent to a central control server for analysis. For use with an autonomous taxi system, for example, the system may incorporate the central server for controlling and updating the taxis in response to received incoming vehicle data 704a to improve maneuvering or object avoidance, among other things. In this configuration, the controller 202 may provide incoming vehicle data 704a updates to the central server to facilitate software updates for the taxies.

In some examples, the application 704 can stream the data to the central server in real-time, or near real-time. In other examples, the application 704 can compile and store the incoming vehicle data 704a in the memory 702 and send periodic updates, or data packages. The application 704 can use the transceiver(s) 714 directly via a radio interface layer (RIL), or other controller, to send the incoming vehicle data 704a to the central server via the transceiver(s) 714.

In some examples, the memory 702 can also store the incoming vehicle data 704a. The incoming vehicle data 704a can include the data provided by the external sensors 106 on the vehicle or by internal sensors 204 mounted on, or near, the controller 202. As discussed below, the incoming vehicle data 704a can include video and still images, GPS coordinates, accelerometer readings, etc. The incoming vehicle data 704a can enable the controller 202 to determine when, and how, the visual references 506 need to be updated. As discussed above, this can include rotating the visual references 506 in response to (e.g., opposite to) a vehicle 108 turn. This can also include moving the visual references throughout the vehicle in response to the vehicle's travel motion.

In some examples, the memory 702 can also include the gaming/advertising module 706. As mentioned above, in some examples, the visual references 506 can be incorporated into a video game, for example. Thus, the user 602 can play the video game during a trip, for example, which incorporates the visual references 506. In this configuration, the visual references 506 can comprise game characters, targets, or other game graphics that can be shot, captured, or otherwise used in the video game. Regardless of their form in the game, as long as the visual references 506 provide the correct perception of motion, they serve their anti-nausea purpose for the system 100.

If the visual references 506 are zombies that are part of a first-person shooter game, for example, then as long as they rotate and/or translate in synch with the motions of the vehicle 108, then they can help to prevent motion sickness. Indeed, visual references 506 that not only move properly, but also provide distraction, may be more effective than simple compass points alone, for example. In some examples, the visual references 506 can be modified versions of scenes proximate the vehicle 108. Pedestrians can become zombies, for example, and buildings can appear to be on fire or bombed out to provide the user 602 with an immersive experience.

As the name implies, in some examples, the gaming/advertising module 706 can also include advertising. In some examples, the visual references 506 can include products from advertisers, for example, logos, or other indicia. In other examples, the visual references 506 themselves can be advertisements, TV shows, movies, or other media from advertising customers. Thus, TV programming can be presented that simply moved the characters in the appropriate manner. As mentioned above, as long as the visual references 506 move in the appropriate manner, their purpose is served.

In some implementations, the processor(s) 708 can comprise a central processing unit (CPU), a graphics processing unit (GPU), or both a CPU and a GPU, or any other sort of processing unit. The processor(s) 708 can be responsible for running software on the controller 202, including the application 704 and gaming/advertising module 706, and to interpret and send messages to the central server, if applicable. In some examples, the processor(s) 708 can also perform calculations and provide instructions based on the various external sensors 106, internal sensors 204, and output device(s) 716.

The controller 202 can also include additional data storage devices (removable and/or non-removable) such as, for example, magnetic disks, optical disks, or tape. Such additional storage is illustrated in FIG. 7 by removable storage 710 and non-removable storage 712. The removable storage 710 and non-removable storage 712 can store the various modules, programs, and algorithms for the application 704, navigation, data gathering, and marketing processes and can include routines for receiving and scheduling routes, among other things.

Non-transitory computer-readable media may include volatile and nonvolatile, removable and non-removable tangible, physical media implemented in technology for storage of information, such as computer readable instructions, data structures, program modules, or other data. The memory 702, removable storage 710, and non-removable storage 712 are all examples of non-transitory computer-readable media. Non-transitory computer-readable media include, but are not limited to, RAM, ROM, electronically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other tangible, physical medium which can be used to store the desired information and which can be accessed by the controller 202. Any such non-transitory computer-readable media may be part of the controller 202 or may be a separate device (e.g., a jump drive) or a separate database or databank (e.g. at a central server).

In some implementations, the transceiver(s) 714 can include any sort of transceivers known in the art. For example, the transceiver(s) 714 may include wired communication components, such as a wired modem or Ethernet port, for communicating with a LAN. The transceiver(s) 714 can include wireless modem(s) to facilitate wireless connectivity with a central server, other vehicles 108, the Internet, and/or an intranet. Further, the transceiver(s) 714 may include a radio transceiver that performs the function of transmitting and receiving radio frequency communications via an antenna (e.g., cellular, Wi-Fi, or Bluetooth®).

In some implementations, the output device(s) 716 can include any sort of output devices known in the art, such as the displays 302 (e.g., a liquid crystal display (LCD), light emitting diode (LED) display, or thin film transistor (TFT) screen), a touchscreen display, lights, speakers, a vibrating mechanism, or a tactile feedback mechanism to provide interactive feedback to the user. In some examples, the output device(s) 716 can play various sounds related to advertising from the gaming/advertising module 706, for example, or sounds associated with the user 602 playing a game included in the gaming/advertising module 706. Output device(s) 716 also include ports for one or more peripheral devices, such as headphones, peripheral speakers, or a peripheral display.

As discussed above, the system 100 can include a projector 104 or one or more displays 302 for displaying the various images associated with the system 100. The system 100 can also utilize flexible screen technology, however, in which the interior panels of the vehicles themselves can display images or video. Thus, the dashboard 304, door panels 510, 512 and/or other interior components can display images or video directly on their surfaces.

In various implementations, internal sensors 204 can include any sort of input devices known in the art. For example, internal sensors 204 may include a microphone, a keyboard/keypad/touchpad, a touch-sensitive display, a proximity sensor, gyroscope, accelerometer, altimeter, and other sensors. A keyboard/keypad may be a standard push button alphanumeric, multi-key keyboard (such as a conventional QWERTY keyboard), a touchscreen keyboard, or one or more other types of keys or buttons, and may also include a joystick, wheel, and/or designated navigation buttons, or the like. In some examples, the internal sensors 204 can also include communication ports to receive data from external sensors or cameras, among other things.

As discussed above, in some examples, the system 100 can utilize data from existing external sensors 106 on the vehicle 108. In other examples, the system 200 can comprise one or more internal sensors 204 mounted in the controller 202 or connected to the controller 202 during installation. In some examples, some of the internal sensors 204 can be housed in the controller 202 and the rest of the internal sensors 204 can be installed on the vehicle 108 and connected to the controller 202 (e.g., using a wired or wireless connection)—as opposed to using embedded, or external sensors 106, from the vehicle 108. This can enable the system 200 to be installed on vehicles 206 as an aftermarket installation.

As shown in FIG. 7, therefore, in some examples, the controller 202 can include one or more internal sensors 204. The internal sensors 204 can specifically include, for example, a navigation module 718, one or more cameras 720, one or more accelerometers 722, and one or more magnetometers 724, among other things. In this configuration, the navigation module 718 can provide location data for the controller 202 to determine when the vehicle 108 has reached a pick-up or drop-off location, for example. The navigation module 718 can include, for example, an onboard GPS receiver, cellular location services, internet-based location services, or other suitable navigation technology.

The one or more cameras 720 can comprise one or more standard cameras mounted on the controller 202 or mounted on the vehicle 108 and connected to the controller 202. In some examples, the controller 202 can be dashboard mounted to enable it to be easily installed on the vehicle 108. In this configuration, the controller 202 can have camera(s) 720 similar to current dashboard cameras, for example, obviating the need to install cameras on the vehicle 108. In other examples, the camera(s) 720 can be installed in various locations on the vehicle 108—such as on the bumpers, the license plate holder, the front and rear dashboard, etc.—and then connected to the controller 202 via a wired (e.g., coaxial cable) or wireless (e.g., Bluetooth®) connection.

The camera(s) 720 can include one or more forward, side, and/or rearward looking cameras 720. The camera(s) 720 can provide streaming video, still pictures, or combinations thereof to the application 704 or the gaming/advertising module 706 for projection or display. The camera(s) 720 may provide periodic updates based on, for example, the velocity of the vehicle 108, and the depth of field of the current view, viewing angle, and the placement of the camera(s) 720, among other things. As mentioned above, it may be desirable for a side-facing camera 720 have a higher refresh rate, for example, because the scene in front of side-facing camera 720 is changing more rapidly than in a front-facing or rear-facing camera 720.

As the name implies, the one or more accelerometers 722 can provide acceleration data to the controller 202 and, by extrapolation, for the vehicle 108. This may be useful to enable the application 704 to detect turns or swerves, for example, to enable the application 704 to update the visual references 506 on the displays 302 or from the projector 104. As discussed above, when the controller 202 detects a right turn, for example, the controller 202 can rotate the visual references 506 on the system 100 to the left to coincide with this movement.

If no acceleration is detected, on the other hand, then the controller 202 may update images at a steady rate based on data from the VSS, for example, when the vehicle 108 is moving. Of course, if the controller 202 senses no acceleration from the accelerometer(s) 722 and the VSS shows zero velocity, the vehicle 108 is stationary. In this case, the controller 202 can either (1) not update the images or (2) update the images only to account for movement outside the vehicle 108 (e.g., due to the movement of other vehicles or pedestrians).

Similarly, the magnetometer(s) 724 can be used to determine the direction of travel of the vehicle 108. This can be used to orient the video data from the camera(s) 720, for example, and can be used in addition to, or instead or, accelerometer(s) 722 data to detect changes in the direction of travel. As discussed above, when the controller 202 detects a right turn, for example, the controller 202 can rotate the images on the system 100 to the left to coincide with this movement.

While several possible examples are disclosed above, examples of the present disclosure are not so limited. For instance, while systems and methods for reducing, or preventing, motion sickness in autonomous vehicles are presented, the system can be used in non-autonomous vehicles and other situations without departing from the spirit of the disclosure. In addition, the location and configuration used for various features of examples of the present disclosure such as, for example, the order of steps, the components of the system 100, 200, whether the system 100, 200 uses projectors 104 or displays 302, or other features can be changed to accommodate variations due to, for example, the size or construction of the vehicle 108, the type of vehicle 108 (e.g., automobile vs. boat vs. plane), or the type of traveling environment. Such changes are intended to be embraced within the scope of this disclosure.

The specific configurations, components, the size and shape of various elements, and whether certain components are separate from, or embedded in, the vehicle can be varied according to particular design specifications or constraints requiring a device, system, or method constructed according to the principles of this disclosure. Such changes are intended to be embraced within the scope of this disclosure. The presently disclosed examples, therefore, are considered in all respects to be illustrative and not restrictive. The scope of the disclosure is indicated by the appended claims, rather than the foregoing description, and all changes that come within the meaning and range of equivalents thereof are intended to be embraced therein.

What is claimed is:

1. A system comprising:
   a display disposed in a passenger compartment of a vehicle;
   one or more processors; and
   memory storing computer-executable instructions that, when executed by the one or more processors, cause the system to:
      receive sensor data from one or more sensors associated with the vehicle;
      cause the display to present a visual reference on a surface of the passenger compartment of the vehicle based at least in part on the sensor data;
      detect, based at least in part on the sensor data, a motion of the vehicle in a first direction; and
      based at least in part on the motion of the vehicle, cause the display to move the visual reference in a second direction,
      wherein the visual reference includes a representation of at least a portion of an object outside of the vehicle that, relative to a position of an occupant in the passenger compartment, is obscured by the vehicle.

2. The system of claim 1, wherein the motion of the vehicle is a rotational motion in the first direction, and the visual reference is moved by at least rotating the visual reference in the second direction opposite the rotational motion in the first direction.

3. The system of claim 1, wherein the one or more sensors comprise at least one of an accelerometer, gyroscope, or a magnetometer to detect the motion of the vehicle.

4. The system of claim 1, wherein the representation of at least the portion of the object included in the visual reference is in front of the vehicle such that, relative to the position of the occupant, the at least the portion of the object is obscured by a dashboard or hood of the vehicle.

5. The system of claim 1, wherein the representation of at least the portion of the object included in the visual reference is beside the vehicle such that, relative to the position of the occupant, the at least the portion of the object is obscured by a door panel of the vehicle.

6. The system of claim 1, wherein from the position of the occupant in the passenger compartment:
   the representation of at least the portion of the object is visible, and
   the at least the portion of the object outside the vehicle is obscured by the vehicle.

7. A method comprising:
   receiving sensor data from one or more sensors associated with a vehicle;
   causing a display to present a visual reference on a surface of a passenger compartment of the vehicle based at least in part on the sensor data;
   detecting, based at least in part on the sensor data, a motion of the vehicle in a first direction; and
   based at least in part on the motion of the vehicle, causing the display to move the visual reference in a second direction relative to the passenger compartment of the vehicle,
   wherein the visual reference includes a representation of at least a portion of an object outside of the vehicle that, relative to a position of an occupant in the passenger compartment, is obscured by the vehicle.

8. The method of claim 7, wherein the one or more sensors comprise one or more external cameras mounted on the vehicle and the sensor data is first sensor data received at a first time, the method further comprising:
   receiving, from the one or more external cameras, second sensor data at a second time after the first time; and
   updating the visual reference based at least in part on receiving the second sensor data from the one or more external cameras.

9. The method of claim 7, wherein the display comprises one or more of a projector or a flexible display.

10. The method of claim 7, further comprising:
    detecting, by the one or more sensors, a location of a passenger inside of the passenger compartment of the vehicle,
    wherein causing the display to present the visual reference on the surface of the passenger compartment of the vehicle is further based on the location of the passenger.

11. The method of claim 7, further comprising:
    determining that the vehicle has reached a destination; and
    responsive to determining that the vehicle has reached the destination:
       ceasing to present the visual reference on the display; and
       causing the display to present marketing materials.

12. The method of claim 7, further comprising:
    detecting, by the one or more sensors, a speed of the vehicle, wherein causing the display to move the visual reference is further based on the speed of the vehicle.

13. The method of claim 7, wherein the display is a dashboard display, the vehicle further comprises a door panel display, and the visual reference is a first visual reference, the method further comprising:
   causing the door panel display to present a second visual reference based at least in part on the sensor data;
   detecting, by the one or more sensors, translational motion of the vehicle in a forward direction; and
   based at least in part on the translational motion of the vehicle being in the forward direction, causing the door panel display to move the second visual reference such that the second visual reference appears to move past the vehicle,
   wherein causing the dashboard display to move the first visual reference comprises causing the first visual reference to appear to grow larger.

14. The method of claim 7, wherein the second direction is a different direction than the first direction.

15. The method of claim 7, wherein from the position of the occupant in the passenger compartment:
   the representation of at least the portion of the object is visible, and
   the at least the portion of the object outside the vehicle is obscured by the vehicle.

16. One or more non-transitory computer-readable media storing instructions that, when executed by one or more processors, cause the one or more processors to perform operations comprising:
   receiving sensor data from one or more sensors associated with a vehicle;
   causing a display to present a visual reference on a surface of a passenger compartment of the vehicle based at least in part on the sensor data;
   detecting, based at least in part on the sensor data, a motion of the vehicle in a first direction; and
   based at least in part on the motion of the vehicle, causing the display to move the visual reference in a second direction relative to a point inside the passenger compartment of the vehicle,
   wherein the visual reference includes a representation of at least a portion of an object outside of the vehicle that, relative to a position of an occupant in the passenger compartment, is obscured by the vehicle.

17. One or more non-transitory computer-readable media of claim 16, wherein the motion of the vehicle is a rotational motion in the first direction, and the visual reference is moved by at least rotating the visual reference in the second direction opposite the rotational motion in the first direction.

18. One or more non-transitory computer-readable media of claim 16, wherein the one or more sensors comprise one or more external cameras mounted on the vehicle and the sensor data is first sensor data received at a first time, the operations further comprising:
   receiving, from the one or more external cameras, second sensor data at a second time after the first time; and
   updating the visual reference based at least in part on receiving the second sensor data from the one or more external cameras.

19. One or more non-transitory computer-readable media of claim 16, the operations further comprising:
   detecting, by the one or more sensors, a location of a passenger inside of the passenger compartment of the vehicle,
   wherein causing the display to present the visual reference on the surface of the passenger compartment of the vehicle is further based on a perspective corresponding to the location of the passenger.

20. One or more non-transitory computer-readable media of claim 16, the operations further comprising:
   detecting, by the one or more sensors, a speed of the vehicle,
   wherein causing the display to move the visual reference is further based on the speed of the vehicle.

* * * * *